(12) United States Patent
Na et al.

(10) Patent No.: US 11,528,640 B2
(45) Date of Patent: Dec. 13, 2022

(54) BASE STATION DEVICE, AND METHOD FOR TRANSMITTING DATA AND SIGNAL

(71) Applicant: SK TELECOM CO., LTD., Seoul (KR)

(72) Inventors: Min Soo Na, Seoul (KR); Gi Wan Choi, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 75 days.

(21) Appl. No.: 16/755,289

(22) PCT Filed: Jan. 10, 2018

(86) PCT No.: PCT/KR2018/000479
§ 371 (c)(1),
(2) Date: Apr. 10, 2020

(87) PCT Pub. No.: WO2019/074164
PCT Pub. Date: Apr. 18, 2019

(65) Prior Publication Data
US 2021/0227426 A1    Jul. 22, 2021

(30) Foreign Application Priority Data
Oct. 12, 2017  (KR) .................. 10-2017-0132811

(51) Int. Cl.
*H04W 72/04* (2009.01)
*H04W 88/08* (2009.01)
*H04L 5/00* (2006.01)
*H04W 28/06* (2009.01)
*H04W 74/08* (2009.01)

(52) U.S. Cl.
CPC ............ *H04W 28/06* (2013.01); *H04L 5/0044* (2013.01); *H04W 72/042* (2013.01); *H04W 74/0833* (2013.01); *H04W 88/08* (2013.01)

(58) Field of Classification Search
None
See application file for complete search history.

(56) References Cited

U.S. PATENT DOCUMENTS

| | | |
|---|---|---|
| 2011/0182255 A1 | 7/2011 | Kim et al. |
| 2016/0233987 A1* | 8/2016 | Arashin .................... H04L 1/06 |
| 2016/0278110 A1 | 9/2016 | Lee et al. |
| 2017/0064743 A1* | 3/2017 | Lei .................... H04W 74/0833 |
| 2017/0079055 A1 | 3/2017 | Aminaka et al. |

(Continued)

FOREIGN PATENT DOCUMENTS

| | | |
|---|---|---|
| CN | 101094432 | 12/2007 |
| CN | 106576327 | 4/2017 |

(Continued)

OTHER PUBLICATIONS

International Search Report dated Jul. 13, 2018 issued in Application No. PCT/KR2018/000479.

(Continued)

*Primary Examiner* — Duc T Duong
(74) *Attorney, Agent, or Firm* — KED & Associates, LLP

(57) ABSTRACT

To consider a structure in which a radio module of a separate base station is extended/designed to have upper layer processing functions, as well as an RF processing function, the present invention defines a new fronthaul interface to reduce the fronthaul capacity required for transmitting data and a signal by a radio module in a separate base station.

15 Claims, 6 Drawing Sheets

(56) References Cited

U.S. PATENT DOCUMENTS

| | | | |
|---|---|---|---|
| 2018/0205456 A1* | 7/2018 | Zhang | H04L 27/26 |
| 2018/0249375 A1* | 8/2018 | Goldhamer | H04L 1/1812 |
| 2019/0053301 A1* | 2/2019 | Hampel | H04W 84/04 |
| 2019/0053317 A1* | 2/2019 | Hampel | H04W 88/085 |
| 2019/0075608 A1* | 3/2019 | Xing | H04L 5/0094 |
| 2019/0223154 A1* | 7/2019 | Jia | H04W 76/27 |
| 2019/0313296 A1* | 10/2019 | Yiu | H04W 36/38 |
| 2019/0327133 A1* | 10/2019 | Gao | H04W 48/16 |
| 2020/0029390 A1* | 1/2020 | Han | H04L 69/16 |
| 2020/0178326 A1* | 6/2020 | Sirotkin | H04W 76/12 |
| 2020/0383164 A1* | 12/2020 | Kim | H04W 76/27 |
| 2021/0288696 A1* | 9/2021 | Jung | H04W 24/10 |

FOREIGN PATENT DOCUMENTS

| | | |
|---|---|---|
| EP | 2 110 955 | 10/2009 |
| KR | 10-2011-0087949 | 8/2011 |
| KR | 10-2014-0073116 | 6/2014 |
| KR | 10-2015-0104658 | 9/2015 |
| WO | WO 2017/028933 | 2/2017 |

OTHER PUBLICATIONS

Jeong, Hwan Seok, "Optical Based Mobile Fronthaul/Backhaul Technology", ETRI, Electronics And Telecommunications Research Institute, Jun. 23, 2015, http:/_/www.kmet.or.kr/board/data/dprogram/1991/H3-2-%C1%A4%C8%AF%BC%AE.pdf See slides 14, 17.
Chinese Office Action dated Oct. 10, 2022 issued in Application No. 201880066769.X.

* cited by examiner

【FIG. 1】
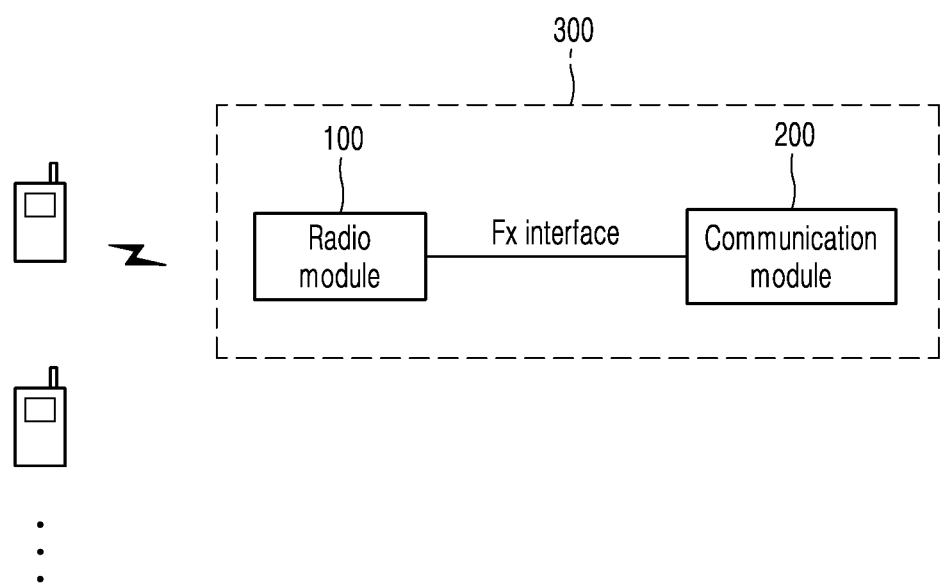

[FIG. 2]
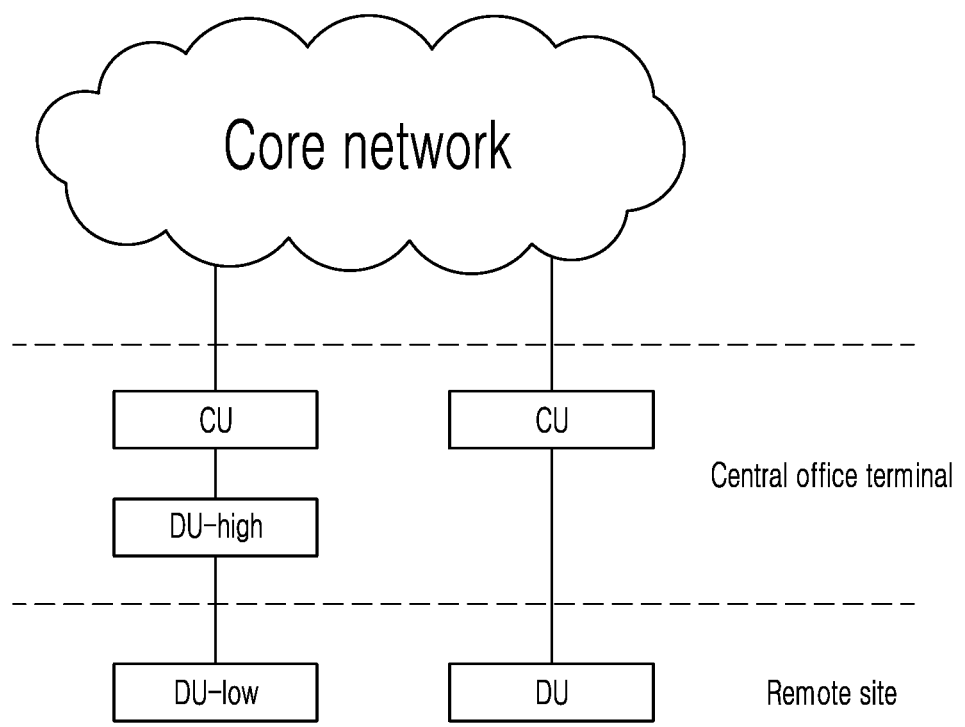

[FIG. 3]
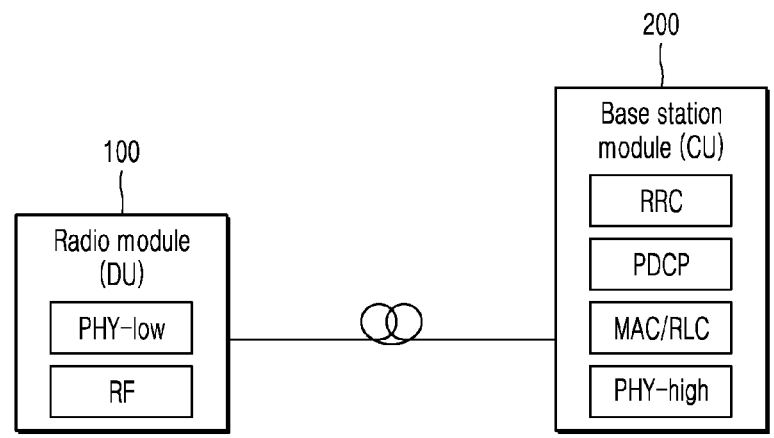
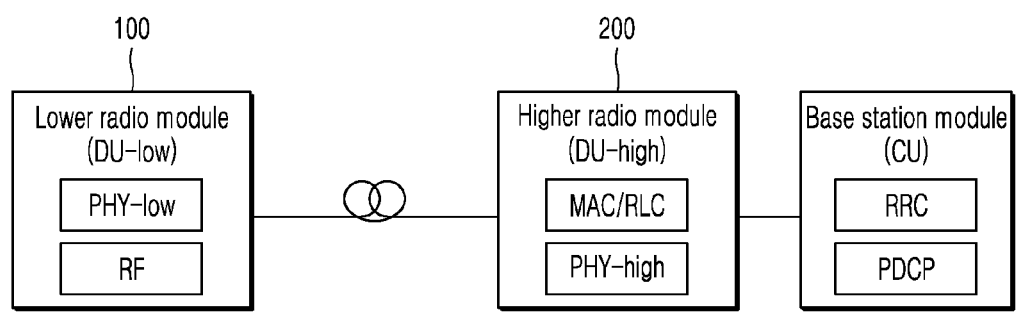

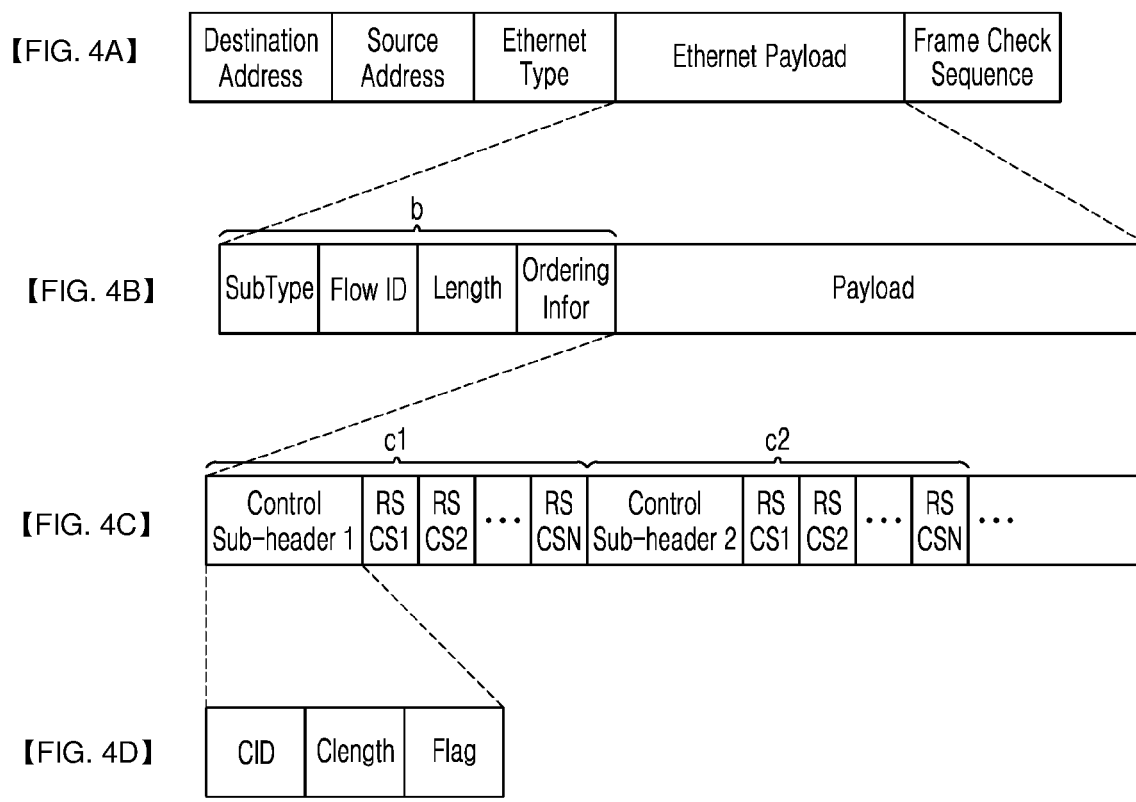

[FIG. 5]
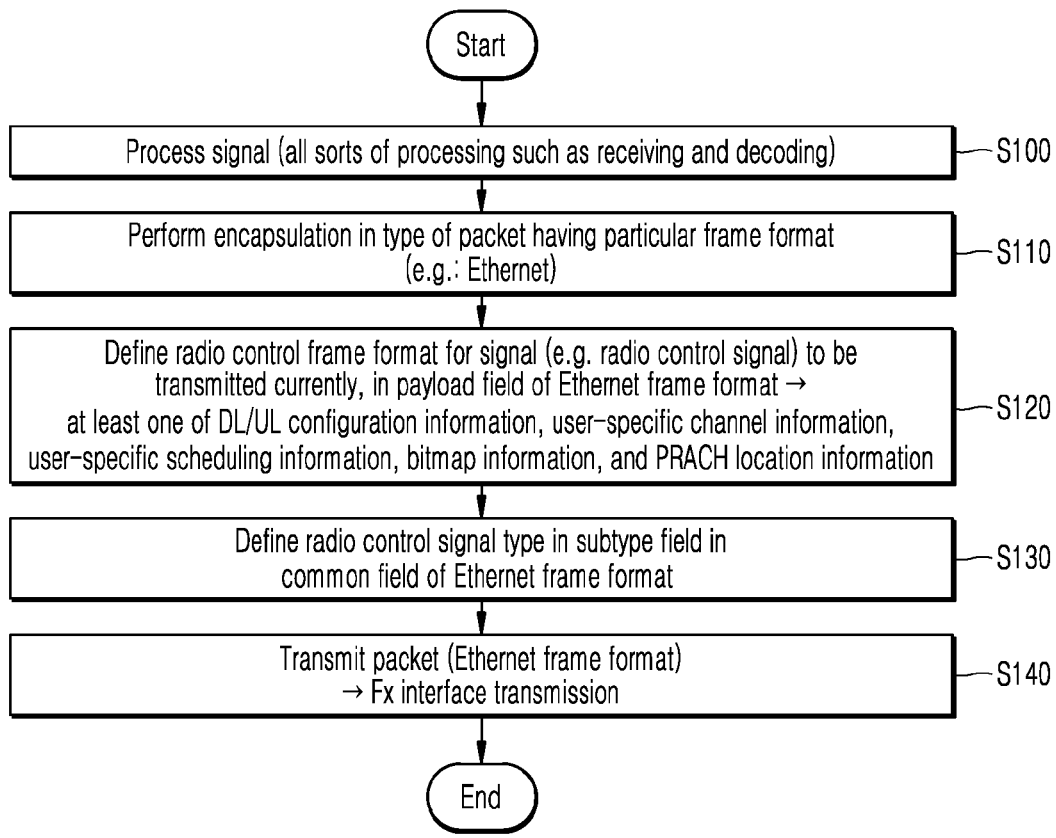

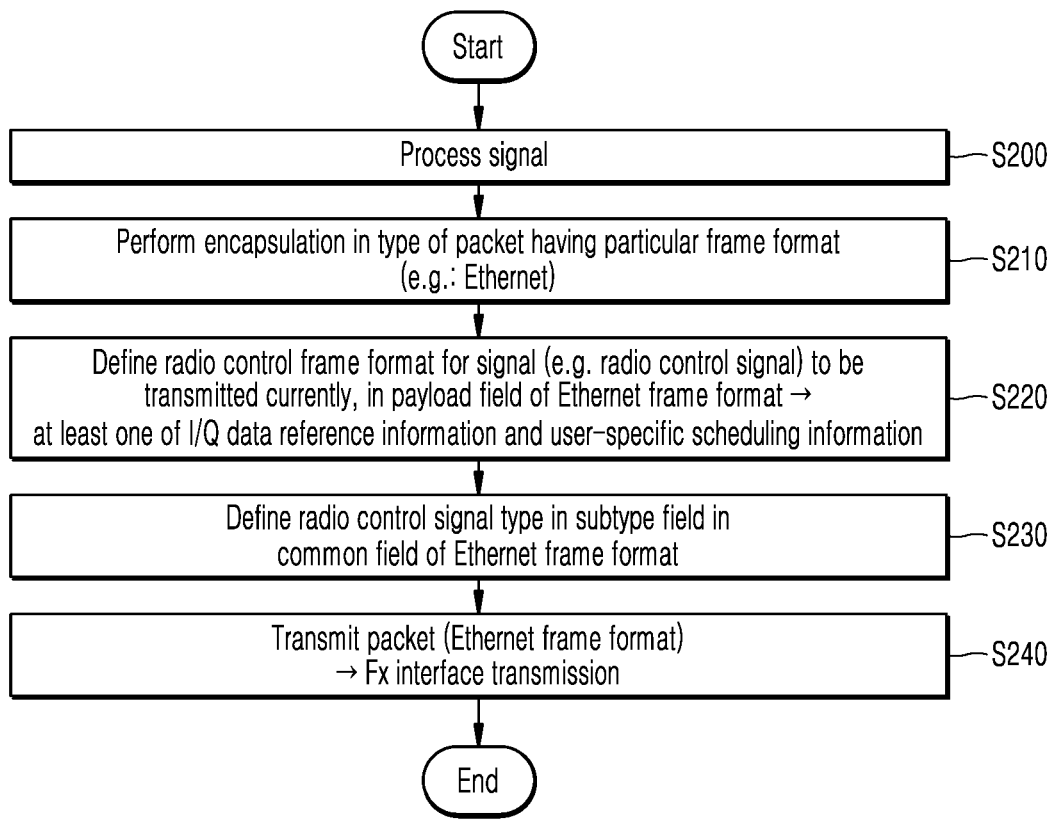
[FIG. 6]

BASE STATION DEVICE, AND METHOD FOR TRANSMITTING DATA AND SIGNAL

CROSS-REFERENCE TO RELATED PATENT APPLICATIONS

This application is a U.S. National Stage Application under 35 U.S.C. § 371 of PCT Application No. PCT/KR2018/000479, filed Jan. 10, 2018, which claims priority to Korean Patent Application No. 10-2017-0132811, filed Oct. 12, 2017, whose entire disclosures are hereby incorporated by reference.

TECHNICAL FIELD

The present disclosure relates to a base station device (hereinafter, a separate base station) technology configuring a separated radio module.

BACKGROUND ART

A 5G communication system accommodates a maximum number of terminals based on limited wireless resources, and supports the scenarios of enhanced mobile broadband (eMBB), massive machine-type communications (mMTC), and ultra-reliable and low latency communications (uRLLC).

Meanwhile, a base station device may be divided into a base station module and a radio module according to internal functions.

Recently, as well as a base station type in which the configuration of a base station module and the configuration of a radio module are integrated, a base station type (hereinafter, separate base station) has appeared in which a base station module and a radio module are separated and then installed/configured at remote distance.

A radio module of a separate base station in a conventional LTE communication system (4G) only includes a radio frequency (RF) processing function, and thus merely supports to transmit or receive a signal (data) through a radio section.

In relation to a separate base station, unlike the conventional radio module simply functioning to transmit or receive a signal (data) through a radio section, a future 5G communication system is to extend the role of the radio module by transferring a processing function in a higher layer, which is managed by a base station module, to a radio module.

In a 5G communication system, a base station module is defined as a central unit (CU), and a radio module is defined as a distributed unit (DU).

Meanwhile, a separate base station in an LTE communication system (4G) uses a fronthaul protocol such as a common public radio interface (CPRI) in order to allow transmission of data and a signal between a base station module and a radio module.

A CPRI is a I/Q sample stream of a RF signal transmitted or received by an antenna, and an interface designed to allow transmission through optical fibers between a base station module (DU) and a radio module (RU) in various speeds and encoding types.

In order to support massive MIMO, etc. and use a carrier bandwidth that is minimum several times to maximum dozen times of that in the conventional LTE (4G), 5G requires fronthaul capacity far greater than currently required fronthaul capacity.

Therefore, a separate base station in a 5G communication system needs a fronthaul interface different from the conventional CPRI with respect to a radio module (DU).

That is, a 5G separate base station is required to define a new fronthaul interface having a structure for reducing capacity of a fronthaul transmitting data and a signal of a radio module (DU).

DETAILED DESCRIPTION OF THE INVENTION

Technical Problem

The present disclosure is to define a new fronthaul interface for transmitting data and a signal by a radio module in a separate base station.

Technical Solution

According to an embodiment, a base station device includes: a radio module configured to perform an RF processing function and a processing function in a physical layer (PHY layer); and a communication module connected to the radio module and configured to perform a higher layer processing function, compared to the processing function performed by the radio module, wherein at least one of data and a signal is transmitted through a particular interface defined based on a packet, between the radio module and communication module.

Specifically, the communication module may be a base station module including a part of processing functions in the PHY layer and a processing function in a layer higher than the PHY layer.

Specifically, the communication module may be a higher radio module connected to a base station module including processing functions in a packet data convergence protocol (PDCP) layer and a layer higher than the PDCP layer, and the higher radio module may include a part of processing functions in the PHY layer and processing functions in a medium access control (MAC) layer and a radio link control (RLC) layer.

Specifically, the radio module and the communication module may be configured to transmit at least one of data and a signal after encapsulating the at least one in a form of a packet having a particular frame format defined for the particular interface.

Specifically, a payload of the particular frame format may include a common field including a subtype field defining a type of data or a signal desired to be transmitted through the payload, and a payload field through which data or a signal having the type defined by the subtype field is transmitted.

Specifically, in a case where a radio control signal (radio specific control signal) related to transmission or reception of a radio signal is transmitted, the radio control signal may be transmitted in the payload field based on a particular radio control frame format, and the radio control frame format is defined to have a structure of a sub header (control sub-header) defining a type of the radio control signal and a signal field transmitting the radio control signal.

Specifically, the payload field may have a structure of additionally defining radio control frame format for each of radio control signals having different types and desired to be transmitted through the payload field, according to the number of the radio control signals.

Specifically, in the sub header, a flag field indicating whether another sub header of another radio control frame format is positioned after the radio control frame format including the sub header, may be defined.

Specifically, a type of a radio control signal transmitted to the radio module by the communication module may be identified by at least one of DL/UL configuration information allocating each symbol to be used for DL or UL transmission, channel information for performing beamforming for each user, scheduling information allocating a layer and a resource block (RB) for each user, bitmap information for classifying a resource block into a user specific RB or a broadcasting RB, and location information relating to a physical random access channel (PRACH).

Specifically, a type of a radio control signal transmitted to the communication module by the radio module may be identified by at least one of I/Q data reference information for transmitting I/Q data after reducing of a bit width of the I/Q data for each user, and scheduling information allocating a layer and a resource block (RB) for each user.

According to an embodiment of the present disclosure, a method for transmitting data and a signal includes: processing at least one of data and a signal to be transmitted, by a communication module of a base station device, which is connected to a radio module of the base station device, the radio module being configured to perform an RF processing function and a processing function in a physical layer (PHY layer), and the communication module being configured to perform a higher layer processing function, compared to the processing function performed by the radio module; and transmitting, by the communication module, the at least one of data and a signal, to the radio module through a particular interface defined based on a packet.

Specifically, the transmitting of the at least one of data and a signal may include transmitting, by the communication module, the at least one of data and a signal after encapsulating the at least one of the data and the signal in a form of a packet having a particular frame format defined for the particular interface.

Specifically, a payload of the particular frame format may include a common field including a subtype field defining a type of data or a signal desired to be transmitted through the payload, and a payload field through which data or a signal having the type defined by the subtype field is transmitted.

Specifically, in a case where a radio control signal (radio specific control signal) related to transmission or reception of a radio signal is transmitted, the radio control signal may be transmitted in the payload field, based on a particular radio control frame format, the radio control frame format being defined to have a structure of a sub header (control sub-header) defining a type of the radio control signal and a signal field transmitting the radio control signal.

Specifically, the payload field may have a structure of additionally defining radio control frame format for each of radio control signals having different types and desired to be transmitted through the payload field, according to the number of the radio control signals.

Specifically, a type of a radio control signal transmitted to the radio module by the communication module may be identified by at least one of DL/UL configuration information allocating each symbol to be used for DL or UL transmission, channel information for performing beamforming for each user, scheduling information allocating a layer and a resource block (RB) for each user, bitmap information for classifying a resource block into a user specific RB or a broadcasting RB, and location information relating to a physical random access channel (PRACH).

Specifically, the method may further include: transmitting, by the radio module, data and a signal to the communication module through the particular interface, wherein a type of a radio control signal transmitted to the communication module by the radio module is identified by at least one of I/Q data reference information for transmitting I/Q data after reducing a bit width of the I/Q data for each user, and scheduling information allocating a layer and a resource block (RB) for each user.

Advantageous Effects

According to embodiments of the present disclosure, a new fronthaul interface is defined for a separate base station, in particular a separate base station where a radio module is expansively designed to have not only an RF processing function but also a processing function in a higher layer.

Accordingly, embodiments of the present disclosure derive the effect of satisfying the needs of a communication system that is to reduce fronthaul capacity for transmitting data and a signal of a radio module in separate base station.

BRIEF DESCRIPTION OF THE DRAWINGS

FIG. 1 is an exemplary diagram showing a configuration of a base station device and a communication system environment to which the device is applied, according to an embodiment of the present disclosure;

FIG. 2 is an exemplary diagram showing a structure of a base station device (separate base station) according to an embodiment of the present disclosure;

FIG. 3 is an exemplary diagram showing frame and field structures defined in a fronthaul interface proposed in the present disclosure;

FIGS. 4A, 4B, 4C, 4D, 5 and 6 are flow charts showing an operation flow of a method for transmitting data and a signal according to an embodiment of the present disclosure.

MODE FOR CARRYING OUT THE INVENTION

Hereinafter, embodiments of the present disclosure will be described with reference to the accompanying drawings.

The present disclosure is related to a future 5G communication system that has actively undergone evolution and discussion currently.

Specifically, the present disclosure relates to a separate base station technology to be used in a 5G communication system.

A 5G communication system receives a maximum number of terminals, based on limited wireless resources, and supports the scenarios of enhanced mobile broadband (eMBB), massive machine-type communications (mMTC), and ultra-reliable and low latency communications (uRLLC).

Meanwhile, a base station device may be divided into a base station module and a radio module according to internal functions.

Recently, as well as a base station type in which the configuration of a base station module and the configuration of a radio module are integrated, a base station type (hereinafter, separate base station) in which a base station module and a radio module are separated and then installed/configured at long distances, has appeared.

A radio module of a separate base station in a conventional LTE communication system (4G) only includes a radio frequency (RF) processing function, and thus simply functions to transmit or receive a signal (data) through a radio section.

In relation to a separate base station, unlike the conventional radio module simply functioning to transmit or receive a signal (data) through a radio section, a future 5G communication system is to move a processing function in a higher layer managed by a base station module, to a radio module so as to extend the role of the radio module.

In a 5G communication system, a base station module is defined as a central unit (CU), and a radio module is defined as a distributed unit (DU).

An extension model of a radio module, which has been discussed in a 5G communication system, includes a model (baseband pooling structure) including, in a radio module (DU), an RF processing function, and a processing function even in a physical layer (PHY layer), a model (integrated DU/antenna structure) further including, in a radio module (DU), processing functions even in a medium access control layer (MAC layer) and a radio link control layer (RLC layer), and the like.

The present disclosure relates to a model having a baseband pooling structure including, in a radio module (DU), an RF processing function, and a processing function even in a PHY layer.

As illustrated in FIG. 2, as a model having a baseband pooling structure, two models may coexist according to a structure of a radio module (DU).

As illustrated in FIG. 2, one of the two models is an integrated DU model that includes, in a radio module (DU), an RF processing function and a part (PHY-low) of processing functions in a PHY layer, and includes, in a base station module (CU) connected to the radio module (DU), a higher layer processing function in a layer higher than or equal to the layer, that is, a part (PHY-high) of the processing functions in the PHY layer, and processing functions in a MAC layer, a RLC layer, a packet data convergence protocol (PDCP) layer, and a radio resource control (RRC) layer.

The other one is a separated DU model that divides a radio module (DU) into a lower radio module (DU-low) and a higher radio module (DU-high).

A separated DU module includes, in a lower radio module (DU-low), an RF processing function and a part (PHY-low) of processing functions in a PHY layer, includes, in a higher radio module (DU-high), a part (PHY-high) of the processing functions in the PHY layer, and processing functions in a MAC layer and a RLC layer, and includes, in a base station module (CU), processing functions in a PDCP layer and a RRC layer.

Meanwhile, a separate base station in an LTE communication system (4G) uses a fronthaul protocol such as a common public radio interface (CPRI) in order to allow transmission of data and a signal between a base station module and a radio module.

A CPRI is a I/Q sample stream of a RF signal transmitted or received by an antenna, and an interface designed to allow transmission through optical fibers between a base station module (DU) and a radio module (RU) in various speeds and encoding types.

In order to support massive MIMO, etc. and use a carrier bandwidth that is minimum several times to maximum dozen times of that in the conventional LTE (4G), 5G requires fronthaul capacity far greater than currently required fronthaul capacity.

Therefore, a separate base station in a 5G communication system needs a fronthaul interface different from the conventional CPRI with respect to a radio module (DU).

That is, a 5G separate base station is required to define a new fronthaul interface having a structure for reducing capacity of a fronthaul transmitting data and a signal of a radio module (DU).

Therefore, the present disclosure is to define a new fronthaul interface designed to transmit data and a signal of a radio module (DU) in a 5G separate base station.

Specifically, the present disclosure is to define a new fronthaul interface designed to reduce capacity of a fronthaul in consideration of a baseband pooling structure of extending and designing for a radio module (DU in the case of an integrated DU module, and DU-low in the case of a separated DU model) of a 5G separate base station up to a processing function (PHY-low) in a higher layer as well as a RF processing function.

Hereinafter, referring to FIG. 1, a communication system environment to which a base station device is applied, and a configuration of the base station device according to an embodiment of the present disclosure will be simply described.

As illustrated in FIG. 1, a base station device 300 according to an embodiment of the present disclosure includes a radio module 100 configured to perform an RF processing function and a processing function in a physical layer (PHY layer), and a communication module 200 connected to the radio module 100 to perform a higher layer processing function, compared to the processing function performed by the radio module 100.

In the base station device 300 according to an embodiment of the present disclosure, at least one of data and a signal is transmitted through a particular interface defined based on packets, between the radio module 100 and the communication module 200.

The base station device 300 described in the present disclosure means a separate base station configuring a separated radio module (DU), and specifically, means a 5G separate base station having a baseband pooling structure.

Therefore, as noted with reference to FIG. 2, if the base station device 300 has a baseband pooling structure of an integrated DU model, the radio module 100 may be a radio module DU, and the communication module 200 may be a base station module (CU).

In addition, as noted with reference to FIG. 2, if the base station device 300 has a baseband pooling structure of a separated DU model, the radio module 100 may be a lower radio module (DU-low), and the communication module 200 may be a higher radio module (DU-high) that includes a part (PHY-high) of processing functions in a PHY layer and processing functions in a MAC layer and an RLC layer, and is connected to a base station module (CU).

That is, if the base station device 300 has a baseband pooling structure of an integrated DU model, the present disclosure defines a packet-based particular interface different from the conventional CPRI, for a fronthaul between the radio module 100 (DU) and the communication module 200 (CU).

In addition, if the base station device 300 has a baseband pooling structure of a separated DU model, the present disclosure defines a packet-based particular interface different from the conventional CPRI, for a fronthaul between the radio module 100 (DU-low) and the communication module 200 (DU-high).

A particular interface, that is a fronthaul interface (hereinafter, Fx interface), proposed in the present disclosure, is applied to between the radio module 100 (DU) and the communication module 200 (CU) in the case of a baseband pooling structure of an integrated DU model, and between the radio module 100 (DU-low) and the communication module 200 (DU-high) in the case of a baseband pooling structure of a separated DU model.

Therefore, in the following description, for convenience of explanation, an integrated DU model and a separated DU model will be not described individually and is collectively referred to as a radio module 100 and a communication module 200.

That is, the radio module 100 and the communication module 200 described below should be understood as a DU 100 and CU 200 in the case of a baseband pooling structure of an integrated DU model, and should be understood as a DU-low 100 and a DU-high 200 in the case of a baseband pooling structure of a separated DU model.

Specifically, the radio module 100 and the communication module 200 in the present disclosure may be configured to transmit at least one of data and a signal to be transmitted, after encapsulating the at least one in the type of a packet having a particular frame format defined for a particular interface, that is, an Fx interface.

For example, the present disclosure may define a particular frame format (hereinafter, Ethernet frame format) for the Fx interface by employing a frame format of Ethernet which is one of general-purpose protocols for packet transmission.

Accordingly, in a downlink transmission from the communication module 200 to the radio module 100, the communication module 200 may transmit data or a signal to be transmitted, after encapsulating the data or signal in the type of a packet having an Ethernet frame format defined for the Fx interface.

In an uplink transmission from the radio module 100 to the communication module 200, the radio module 100 may transmit data or a signal to be transmitted, after encapsulating the data or signal in the type of a packet having an Ethernet frame format defined for the Fx interface.

As described above, if a general-purpose protocol (e.g. Ethernet) for packet transmission is used for a fronthaul between the radio module 100 and the communication module 200 instead of the conventional CPRI, inexpensive switching equipment can be used through a packet network configuration of the fronthaul, and an open-type fronthaul interface facilitating interoperability of information processing between multiple vendors can be defined.

The Fx interface proposed in the present disclosure may operate based on the Ethernet protocol, and may transfer at least one of data and a signal between the radio module 100 and the communication module 200.

Four types of data and a signal transferred in the Fx interface proposed in the present disclosure are defined as below.

One type corresponds to user plane data that means I/Q modulation or bit information defined in a user plane.

One type corresponds to, rather than the user plane data, a radio specific control signal that means time-critical and radio-specific control information required to be directly transferred between the radio module 100 and the communication module 200.

One type corresponds to a general control signal that means management-specific control information (e.g. link setup and control) required to be directly transferred between the radio module 100 and the communication module 200.

One type corresponds to a C&M plane signal that means control and management information required to be transferred in the radio module 100 and the communication module 200 and defined in a control and management plane.

The present disclosure proposes a specific scheme (technology) of transmitting a radio specific control signal among data and signals having the four types, which can be transferred through the proposed Fx interface.

Hereinafter, referring to FIG. 3, frame and field structures defined in a fronthaul interface, that is the Fx interface, proposed in the present disclosure, will be described in detail.

A payload of a particular frame format, that is an Ethernet frame format, defined for the Fx interface proposed in the present disclosure, includes a common field and a payload field.

In the payload of the Ethernet frame format, the common field includes a subtype field defining the type of data or a signal desired to be transmitted through the payload.

In the payload of the Ethernet frame format, the payload field is a field through which data or a signal having a type defined by the subtype field is transmitted.

The present disclosure proposes a specific scheme (technology) of transmitting a radio specific control signal, and thus in the following description, for convenience of explanation, the transmission of data will be omitted, and the transmission of a signal, in particular a radio specific control signal, will be discussed mainly.

FIG. 3 illustrates a particular frame format, that is an Ethernet frame format (A), defined for the Fx interface.

In the Ethernet frame format (A), Ethernet framing follows IEEE 802.3, a destination address means a destination MAC address, a source address means a source MAC address, an Ethernet type means a protocol type encapsulated in an Ethernet payload, and a frame check sequence means information for checking a CRC between transmission and reception.

In a case of downlink transmission from the communication module 200 to the radio module 100, the communication module 200 may transmit a signal (specifically, radio specific control signal) to be transmitted, in an Ethernet frame format (A) packet type in which a destination address, a source address, an Ethernet type, and a frame check sequence are configured and the signal is encapsulated in a payload (Ethernet payload).

Similarly, also in a case of uplink signal transmission from the radio module 100 to the communication module 200, the radio module 100 may transmit a signal (specifically, radio specific control signal) to be transmitted, in an Ethernet frame format (A) packet type in which a destination address, a source address, an Ethernet type, and a frame check sequence are configured and the signal is encapsulated in a payload (Ethernet payload).

Specifically, a payload (Ethernet payload) of the Ethernet frame format defined in the present disclosure includes a common field (b) and a payload field as illustrated in (B) of FIG. 3.

The common field (b) includes a subtype field defining the type of a signal desired to be transmitted through the payload (Ethernet payload), and in addition, may include a flowID field, a length field, and an ordering information field.

If a radio specific control signal (hereinafter, RSCS) is transmitted through the payload (Ethernet payload), a field value (e.g. 0001 0011b) defined for the RSCS type may be recorded (included) in the subtype field of the common field (b).

In this case, the payload field in the payload (Ethernet payload) of the Ethernet frame format may include a signal, that is an RSCS, having the type (e.g. 0001 0011b) defined by the subtype field.

As illustrated in (C) in FIG. 3, in the payload field in the payload (Ethernet payload) of the Ethernet frame format, if a radio control signal (radio specific control signal) related to transmission or reception of a radio signal is transmitted, that is, an RSCS is transmitted, the RSCS may be transmitted based on a particular radio control frame format defined as a structure including a sub header (control sub-header) defining the type of the RSCS and a signal field transmitting the RSCS.

That is, as illustrated in (C) in FIG. 3, in a case of RSCS transmission through the payload field in the payload (Ethernet payload) of the Ethernet frame format, individual radio control frame formats (c1, c2, . . . ) for RSCSs desired to be transmitted and having different types are sequentially defined, and on the basis of each of the radio control frame formats (c1, c2, . . . ), an RSCS having a type defined by a sub header (e.g. control sub-header 1) of a corresponding radio control frame format (e.g. c1) is transmitted through a signal field (e.g. RSCS1, RSCS2, . . . RSCSN) of the corresponding radio control frame format (e.g. c1).

The payload field has a structure capable of additionally defining radio control frame formats (c1, c2, . . . cN) for RSCSs having different types and desired to be transmitted through the payload field, according to the number of the RSCSs.

(D) of FIG. 3 illustrates a sub header (control sub-header) of a radio control frame format in detail.

In the sub header (control sub-header), a CID field for defining the type of an RSCS to be transmitted (transferred) through the payload field, in particular, a signal field of a current radio control frame format in the payload field, is defined. In the CID field, an ID value is recorded (included) differently according to the types of an RSCS to be transmitted (transferred).

In the sub header (control sub-header), a Clength field for defining the packet length of the RSCS to be transmitted (transferred) through the payload field, in particular, the signal field of the current radio control frame format in the payload field, is defined.

In the sub header (control sub-header), a flag field indicating whether another sub header of another radio control frame format is positioned after the radio control frame format including the sub header, is defined.

A transmission node may record (include), in a flag field in a sub header (control sub-header), a flag value (e.g. 0) defined to indicate that another sub header of another radio control frame format is not positioned after a current radio control frame format.

Accordingly, a reception node may identify the flag value (e.g. 0) in the flag field in the sub header (control sub-header) to recognize that an RSCS having been transmitted based on the current radio control frame format is the last RSCS among RSCSs transmitted through a current packet having a current Ethernet frame format and RSCS transmission through the packet is completed.

Hereinafter, the type of a radio control signal, that is, an RSCS, transmitted (transferred) through the Fx interface proposed in the present disclosure will be described in detail.

Specifically, in a case of downlink transmission from the communication module 200 to the radio module 100, the type of a radio control signal may be identified as at least one of DL/UL configuration information allocating each symbol to be used for DL or UL transmission, channel information for performing beamforming for each user, scheduling information allocating a layer and a resource block (RB) for each user, bitmap information for classifying a resource block into a user specific RB or a broadcasting RB, and location information relating to a physical random access channel (PRACH).

In this case, different ID values may be defined for the types of RSCSs corresponding to DL/UL configuration information, user-specific channel information, user-specific scheduling information, bitmap information, and PRACH location information, respectively.

In relation to DL/UL configuration information, in a CID field in a sub header (control sub-header) of a radio control frame format configured for the DL/UL configuration information, an ID value indicating the type of the DL/UL configuration information may be recorded (included), and the DL/UL configuration information may be transmitted after being included in a signal field subsequent to the sub header (control sub-header).

In a case of 5G, each of 14 symbols in one TTI may be dynamically allocated to be used for DL or UL transmission.

Therefore, the communication module 200 (CU in a case of an integrated DU model, and DU-high in a case of a separated DU model) may transmit TTI-unit DL/UL configuration information, based on a radio control frame format configured in a payload field in a payload (Ethernet payload) of an Ethernet frame format proposed in the present disclosure, the DL/UL configuration information being obtained through all sorts of processing, such as decoding of resource allocation information received by the module from a higher node.

In relation to user-specific channel information, in a CID field in a sub header (control sub-header) of a radio control frame format configured for the user-specific channel information, an ID value indicating the type of the user-specific channel information may be recorded (included), and the user-specific channel information may be transmitted after being included in a signal field subsequent to the sub header (control sub-header).

In a case of massive multi input multi output (MIMO) employed in 5G, a BF weight is required for beamforming for each user.

Also, the radio module 100 (DU in a case of an integrated DU model, and DU-low in a case of a separated DU model) is required to generate a BF weight for each user by using user-specific channel information in order to perform beamforming (BF).

Therefore, the communication module 200 (CU in a case of an integrated DU model, and DU-high in a case of a separated DU model) may transmit user-specific channel information (e.g. target antenna information, target RB size and position, transmission channel information, etc.), based on a radio control frame format configured in a payload field in a payload (Ethernet payload) of an Ethernet frame format proposed in the present disclosure, the user-specific channel information being estimated or obtained through all sorts of processing, such as beam sweeping for each user.

In relation to user-specific scheduling information, in a CID field in a sub header (control sub-header) of a radio control frame format configured for the user-specific scheduling information, an ID value indicating the type of the user-specific scheduling information may be recorded (included), and the user-specific scheduling information may be transmitted after being included in a signal field subsequent to the sub header (control sub-header).

In a case of massive MIMO employed in 5G, different users may be allocated for layers and RBs in order to maximize the performance (scheduling for each user).

Also, user-specific scheduling information is required to be transferred (transmitted) to the radio module 100 (DU in a case of an integrated DU model, and DU-low in a case of a separated DU model) that has a processing function in a PHY layer operating based on the user-specific scheduling information.

Therefore, the communication module 200 (CU in a case of an integrated DU model, and DU-high in a case of a separated DU model) may transmit user-specific scheduling information (e.g. target layer information and RB allocation bitmap), based on a radio control frame format configured in a payload field in a payload (Ethernet payload) of an Ethernet frame format proposed in the present disclosure, the user-specific scheduling information being obtained through all sorts of processing, such as decoding of resource allocation information received by the module from a higher node.

In relation to bitmap information, in a CID field in a sub header (control sub-header) of a radio control frame format configured for the bitmap information, an ID value indicating the type of the bitmap information may be recorded (included), and the bitmap information may be transmitted after being included in a signal field subsequent to the sub header (control sub-header).

In a case of MIMO employed in 5G, different BF weights are used for RBs (more specifically, resource element (RE)) according to whether each of the RBs corresponds to a user-specific RB or a broadcasting RB.

Therefore, the separate radio module 100 (DU in a case of an integrated DU model, and DU-low in a case of a separated DU model) requires RB bitmap information for classifying each of RBs into a user-specific RB or a broadcasting RB.

Therefore, the communication module 200 (CU in a case of an integrated DU model, and DU-high in a case of a separated DU model) may transmit bitmap information (e.g. RB bitmap and RE bitmap), based on a radio control frame format configured in a payload field in a payload (Ethernet payload) of an Ethernet frame format proposed in the present disclosure, the bitmap information being obtained through all sorts of processing, such as decoding of resource allocation information received by the module from a higher node.

In relation to PRACH location information, in a CID field in a sub header (control sub-header) of a radio control frame format configured for the PRACH location information, an ID value indicating the type of the PRACH location information may be recorded (included), and the PRACH location information may be transmitted after being included in a signal field subsequent to the sub header (control sub-header).

Therefore, the communication module 200 (CU in a case of an integrated DU model, and DU-high in a case of a separated DU model) may transmit PRACH location information (e.g. PRACH type, PRACH configuration index, and PRACH frequency offset), based on a radio control frame format configured in a payload field in a payload (Ethernet payload) of an Ethernet frame format proposed in the present disclosure, the PRACH location information being obtained through all sorts of processing, such as decoding of system information received by the module from a higher node.

In a case of uplink transmission from the radio module 100 to the communication module 200, the type of a radio control signal may be identified as at least one of I/Q data reference information for transmitting I/Q data after reducing of the bit width thereof for each user, and scheduling information allocating a layer and a resource block (RB) for each user.

In this case, different ID values may be defined for the types of RSCSs corresponding to user-specific I/Q data reference information and user-specific scheduling information, respectively.

In relation to user-specific I/Q data reference information, in a CID field in a sub header (control sub-header) of a radio control frame format configured for the user-specific I/Q data reference information, an ID value indicating the type of the user-specific I/Q data reference information may be recorded (included), and the user-specific I/Q data reference information may be transmitted after being included in a signal field subsequent to the sub header (control sub-header).

A 5G separate base station is required to reduce the bit width of UL transmission data in order to reduce UL fronthaul capacity, and reference information relating to I/Q data is required for reducing fronthaul capacity with minimizing loss of information.

Also, reference information of I/Q data transmitted or received by the communication module 200 (CU in a case of an integrated DU model, and DU-high in a case of a separated DU model) is required for reconstructing the bit width of the I/Q data.

Therefore, the radio module 100 (DU in a case of an integrated DU model, and DU-low in a case of a separated DU model) may transmit reference information (e.g. I/Q reference value) of I/Q data, based on a radio control frame format configured in a payload field in a payload (Ethernet payload) of an Ethernet frame format proposed in the present disclosure, the reference information being obtained through all sorts of calculation processing for each user.

In relation to user-specific scheduling information, in a CID field in a sub header (control sub-header) of a radio control frame format configured for the user-specific scheduling information, an ID value indicating the type of the user-specific scheduling information may be recorded (included), and the user-specific scheduling information may be transmitted after being included in a signal field subsequent to the sub header (control sub-header).

User-specific scheduling information for UL transmission serves the same function as that of user-specific scheduling information for DL transmission described above, and the contents included in the information for UL transmission are also identical to or correspond to those in the information for DL transmission.

Therefore, the radio module 100 (DU in a case of an integrated DU model, and DU-low in a case of a separated DU model) may transmit user-specific scheduling information (e.g. target layer information and RB allocation bitmap), based on a radio control frame format configured in a payload field in a payload (Ethernet payload) of an Ethernet frame format proposed in the present disclosure.

As described above, an embodiment of the present disclosure defines a new fronthaul interface, that is an Fx interface, for transmitting data and a signal by a radio module in a separate base station, in particular a 5G separate base station, so that the effect of satisfying the needs of a 5G communication system that is to reduce fronthaul capacity, is derived.

In addition, an embodiment of the present disclosure implements a scheme (technology) of transmitting a radio specific control signal (RSCS) required to be essentially transmitted between a radio module (DU in a case of an integrated DU model, and DU-low in a case of a separated DU model) and a communication module (CU in a case of an integrated DU model, and DU-high in a case of a separated DU model), in consideration of a baseband pooling structure of a 5G separate base station, for extending and designing up to a processing function (PHY-low) in a higher layer. Consequently, the effect of satisfying the needs of a 5G communication system is derived.

Hereinafter, a method for transmitting data and a signal according to an embodiment of the present disclosure will be described with reference to FIGS. 4 and 5.

A method for transmitting data and a signal according to an embodiment of the present disclosure relates to a scheme (technology) of transmitting data and a signal between a radio module (DU in a case of an integrated DU model, and DU-low in a case of a separated DU model) and a communication module (CU in a case of an integrated DU model, and DU-high in a case of a separated DU model) in a separate base station having a baseband pooling structure.

In addition, a method for transmitting data and a signal according to an embodiment of the present disclosure proposes a specific scheme (technology) of transmitting a radio specific control signal among data and signals having the four types, which can be transferred through a new fronthaul interface, that is a Fx interface, proposed in the present disclosure.

First, a method for transmitting data and a signal according to an embodiment of the present disclosure will be described with reference to FIG. 4 in view of downlink transmission.

In a method for transmitting data and a signal according to an embodiment of the present disclosure, a communication module 200 (CU in a case of an integrated DU model, and DU-high in a case of a separated DU model) performs all sorts of processing on a signal (radio control signal, hereinafter, RSCS) to be transmitted (transferred) to a radio module 100 (DU in a case of an integrated DU model, and DU-low in a case of a separated DU model) (S100).

In an example relating to DL/UL configuration information among RSCSs, the communication module 200 may obtain TTI-unit DL/UL configuration information through all sort of processing, such as decoding of resource allocation information received from a higher node.

In addition, the communication module 200 may estimate or obtain individual RSCSs corresponding to user-specific channel information, user-specific scheduling information, bitmap information, and PRACH location information through all sorts of required processing.

In a method for transmitting data and a signal according to an embodiment of the present disclosure, the communication module 200 encapsulates the RSCS obtained through the processing in operation S100, in the type of a packet having a particular frame format, that is an Ethernet frame format, defined for the Fx interface proposed in the present disclosure (S110).

Specifically, the communication module 200 encapsulates the RSCS obtained through the processing in operation S100, in a payload (Ethernet payload) of the Ethernet frame format (A in FIG. 3).

In relation to a specific encapsulation scheme or structure, the communication module 200 defines individual radio control frame formats for different types of RSCSs to be currently transmitted, in a payload field in the payload (Ethernet payload) of the Ethernet frame format (A in FIG. 3) (S120).

That is, as illustrated in (C) in FIG. 3, the communication module 200 sequentially define, in the payload field in the payload (Ethernet payload) of the Ethernet frame format (A in FIG. 3), individual radio control frame formats (c1, c2 . . . ) for different types of RSCSs desired to be transmitted.

In an example of downlink transmission by the communication module 200, the type of a RSCS may be identified as at least one of DL/UL configuration information, user-specific channel information, user-specific scheduling information, bitmap information, and PRACH location information.

If RSCSs to be transmitted in a current packet correspond to all of DL/UL configuration information, user-specific channel information, user-specific scheduling information, bitmap information, and PRACH location information, the communication module 200 defines individual radio control frame formats for the DL/UL configuration information, the user-specific channel information, the user-specific scheduling information, the bitmap information, and the PRACH location information.

In an example relating to DL/UL configuration information representatively selected among RSCSs, an ID value indicating the type of DL/UL configuration information may be recorded (included) in a CID field in a sub header (control sub-header) of a radio control frame format configured for the DL/UL configuration information, and the DL/UL configuration information may be included in a signal field subsequent to the sub header (control sub-header) in operation S120.

In addition, the communication module 200 may record (include) a field value (e.g. 0001 0011b) defined for the RSCS type, in a common field (b), in particular a subtype field, in the payload (Ethernet payload) of the Ethernet frame format (A in FIG. 3), so as to define the RSCS type for a current packet (S130).

Meanwhile, the order of operations S120 and S130 may be inverted.

In a method for transmitting data and a signal according to an embodiment of the present disclosure, the communication module 200 transmits the packet having the Ethernet frame format (A in FIG. 3), in which the RSCS has been encapsulated, to the radio module 100 (S140).

That is, the communication module 200 sequentially defines, in the payload field in the payload (Ethernet payload) of the Ethernet frame format defined in the present disclosure, individual radio control frame formats (c1, c2 . . . ) for different types of RSCSs desired to be transmitted, and transmits (transfers) the RSCSs to the radio module 100, based on the radio control frame formats (c1, c2 . . . ), respectively.

Hereinafter, a method for transmitting data and a signal according to an embodiment of the present disclosure will be described with reference to FIG. 6 in view of uplink transmission.

In a method for transmitting data and a signal according to an embodiment of the present disclosure, a radio module 100 (DU in a case of an integrated DU model, and DU-low in a case of a separated DU model) performs all sorts of processing on a signal (radio control signal, hereinafter, RSCS) to be transmitted (transferred) to a communication module 200 (CU in a case of an integrated DU model, and DU-high in a case of a separated DU model) (S200).

In a method for transmitting data and a signal according to an embodiment of the present disclosure, the radio module 100 encapsulates the RSCS obtained through the processing in operation S200, in the type of a packet having a particular frame format, that is an Ethernet frame format, defined for the Fx interface proposed in the present disclosure (S210).

Specifically, the radio module 100 encapsulates the RSCS obtained through the processing in operation S200, in a payload (Ethernet payload) of the Ethernet frame format (A in FIG. 3).

In relation to a specific encapsulation scheme or structure, the radio module 100 defines a radio control frame format for each of different types of RSCSs to be currently transmitted, in a payload field in the payload (Ethernet payload) of the Ethernet frame format (A in FIG. 3) (S220).

That is, as illustrated in (C) in FIG. 4, the radio module 100 sequentially define, in the payload field in the payload (Ethernet payload) of the Ethernet frame format (A in FIG. 3), individual radio control frame formats (c1, c2 . . . ) for different types of RSCSs desired to be transmitted.

In an example of uplink transmission by the radio module 100, the type of a RSCS may be identified as at least one of user-specific I/Q data reference information and user-specific scheduling information.

If RSCSs to be transmitted in a current packet correspond to both user-specific I/Q data reference information and user-specific scheduling information, the radio module 100 defines individual radio control frame formats for the user-specific I/Q data reference information and the user-specific scheduling information.

In an example relating to user-specific I/Q data reference information representatively selected among RSCSs, an ID value indicating the type of user-specific I/Q data reference information may be recorded (included) in a CID field in a sub header (control sub-header) of a radio control frame format configured for the user-specific I/Q data reference information, and the user-specific I/Q data reference information may be included in a signal field subsequent to the sub header (control sub-header) in operation S220.

In addition, in a method for transmitting data and a signal according to an embodiment of the present disclosure, the radio module 100 may record (include) a field value (e.g. 0001 0011b) defined for the RSCS type, in a common field (b), in particular a subtype field, in the payload (Ethernet payload) of the Ethernet frame format (A in FIG. 3), so as to define the RSCS type for a current packet (S230).

Meanwhile, the order of operations S220 and S230 may be inverted.

In a method for transmitting data and a signal according to an embodiment of the present disclosure, the radio module 100 transmits the packet having the Ethernet frame format (A in FIG. 3), in which the RSCS has been encapsulated, to the communication module 200 (S240).

That is, the radio module 100 sequentially defines, in the payload field in the payload (Ethernet payload) of the Ethernet frame format defined in the present disclosure, individual radio control frame formats (c1, c2 . . . ) for different types of RSCSs desired to be transmitted, and transmits (transfers) the RSCSs to the communication module 200, based on the radio control frame formats (c1, c2 . . . ), respectively.

As described above, an embodiment of the present disclosure defines a new fronthaul interface, that is an Fx interface, for transmitting data and a signal by a radio module in a separate base station, in particular a 5G separate base station, so that the effect of satisfying the needs of a 5G communication system that is to reduce fronthaul capacity, is derived.

In addition, an embodiment of the present disclosure implements a scheme (technology) of transmitting a radio specific control signal (RSCS) required to be essentially transmitted between radio module (DU in a case of an integrated DU model, and DU-low in a case of a separated DU model) and a communication module (CU in a case of an integrated DU model, and DU-high in a case of a separated DU model), in consideration of a baseband pooling structure of a 5G separate base station, for extending and designing up to a processing function (PHY-low) in a higher layer. Consequently, the effect of satisfying the needs of a 5G communication system is derived.

A method for transmitting data and a signal according to an embodiment of the present disclosure may be implemented in a type of a program command that can be performed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer readable recording medium include magnetic media such as hard disks, floppy disks and magnetic tapes, optical media such as a compact disc read-only memory (CD-ROM) and a digital versatile disc (DVD), magneto-optical media such as floptical disks, and hardware devices such as a read-only memory (ROM), a random access memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and the technical idea of the present disclosure covers a range in which anyone who has common knowledge in the technical field to which the present disclosure belongs can make various modifications and changes without departing from the substance of the present disclosure claimed by claims below.

The invention claimed is:

1. A base station device comprising:
a non-transitory computer readable memory that stores instructions which, when implemented by the base station device, cause the base station device to:
provide a radio module configured to perform a radio frequency (RF) processing function and a processing function in a physical layer (PHY layer); and
provide a communication module connected to the radio module and configured to perform a higher layer processing function with respect to the processing function performed by the radio module,
wherein at least one of data or a signal is transmitted through a particular interface defined based on a packet, between the radio module and communication module,
wherein the instructions further cause the base station device to configure the radio module and the communication module to transmit the at least one of the data or the signal by encapsulating the at least one of the data or the signal in a form of the packet having a particular frame format defined for the particular interface,
wherein a radio control signal (radio specific control signal) related to transmission or reception of a radio signal is transmitted in the packet based on a radio control frame format, and wherein the radio control frame format includes a sub header (control sub-header) for defining a type of the radio control signal and a signal field for transmitting the radio control signal.

2. The base station device of claim 1, wherein the communication module is a base station module including a part of processing functions in the PHY layer and a processing function in a layer higher than the PHY layer.

3. The base station device of claim 1,
wherein the communication module is a higher radio module connected to a base station module including processing function in a packet data convergence protocol (PDCP) layer and a layer higher than the PDCP layer, and
wherein the higher radio module includes a part of processing functions in the PHY layer and processing functions in a medium access control (MAC) layer and a radio link control (RLC) layer.

4. The base station device of claim 1, wherein a payload of the particular frame format includes a common field including a subtype field defining a type of the data or the signal transmitted through the payload, and a payload field through which the data or the signal having the type defined by the subtype field is transmitted.

5. The base station device of claim 4, wherein the radio control signal is transmitted in the payload field.

6. The base station device of claim 5, wherein the payload field has a structure of additionally defining radio control frame format for each of radio control signals with different types transmitted through the payload field according to the number of the radio control signals.

7. The base station device of claim 5, wherein the sub header is defined to include a flag field indicating whether another sub header of another radio control frame format is positioned after the radio control frame format including the sub header.

8. The base station device of claim 5, wherein a type of a radio control signal transmitted to the radio module by the communication module is identified by at least one of DL/UL configuration information allocating each symbol to be used for DL or UL transmission, channel information for performing beamforming for each user, scheduling information allocating a layer and a resource block (RB) for each user, bitmap information for classifying a resource block into a user specific RB or a broadcasting RB, and location information relating to a physical random access channel (PRACH).

9. The base station device of claim 5, wherein a type of a radio control signal transmitted to the communication module by the radio module is identified by at least one of I/Q data reference information for transmitting I/Q data with reducing of a bit width of the I/Q data for each user, and scheduling information allocating a layer and a resource block (RB) for each user.

10. A method for transmitting data and a signal, the method comprising:
processing at least one of data and a signal to be transmitted by a communication module of a base station device connected to a radio module of the base station device, the radio module being configured to perform an RF processing function and a processing function in a physical layer (PHY layer), and the communication module being configured to perform a higher layer processing function with respect to the processing function performed by the radio module; and
transmitting, by the communication module, the at least one of data or a signal to the radio module through a particular interface defined based on a packet,
wherein transmitting the at least one of the data or the signal includes transmitting, by the communication module, the at least one of the data or the signal by encapsulating the at least one of the data or the signal in a form of the packet having a particular frame format defined for the particular interface,
wherein a radio control signal (radio specific control signal) related to transmission or reception of a radio signal is transmitted in the packet, based on a radio control frame format, and
wherein the radio control frame format is defined to have a sub header (control sub-header) for defining a type of the radio control signal and a signal field for transmitting the radio control signal.

11. The method of claim 10, wherein a payload of the particular frame format includes a common field including a subtype field defining a type of data or a signal transmitted through the payload, and a payload field through which data or a signal having the type defined by the subtype field is transmitted.

12. The method of claim 11, wherein the radio control signal is transmitted in the payload field.

13. The method of claim 12, wherein the payload field has a structure of additionally defining radio control frame format for each of radio control signals with different types transmitted through the payload field according to the number of the radio control signals.

14. The method of claim 12, wherein a type of a radio control signal transmitted to the radio module by the communication module is identified by at least one of DL/UL configuration information allocating each symbol to be used for DL or UL transmission, channel information for performing beamforming for each user, scheduling information allocating a layer and a resource block (RB) for each user, bitmap information for classifying a resource block into a user specific RB or a broadcasting RB, and location information relating to a physical random access channel (PRACH).

15. The method of claim 12, further comprising:
transmitting, by the radio module, data and a signal to the communication module through the particular interface,
wherein a type of a radio control signal transmitted to the communication module by the radio module is identified by at least one of I/Q data reference information for transmitting I/Q data with reducing of a bit width of the I/Q data for each user, and scheduling information allocating a layer and a resource block (RB) for each user.

* * * * *